(12) United States Patent
Choi

(10) Patent No.: US 8,138,639 B2
(45) Date of Patent: Mar. 20, 2012

(54) LINEAR VIBRATOR

(75) Inventor: Jun Kun Choi, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 117 days.

(21) Appl. No.: 12/552,881

(22) Filed: Sep. 2, 2009

(65) Prior Publication Data

US 2011/0018366 A1    Jan. 27, 2011

(30) Foreign Application Priority Data

Jul. 27, 2009  (KR) .................. 10-2009-0068404

(51) Int. Cl.
*H02K 33/06* (2006.01)
*H02K 5/15* (2006.01)

(52) U.S. Cl. ........... 310/15; 310/36; 310/89; 340/407.1; 381/396

(58) Field of Classification Search ............... 310/12.22, 310/12.24, 12.31, 14, 36, 81, 15, 89; 340/7.6, 340/384.1, 388.1, 407.1; 381/396, 412, 417; 335/296

See application file for complete search history.

(56) References Cited

U.S. PATENT DOCUMENTS

| | | | |
|---|---|---|---|
| 4,644,204 A * | 2/1987 | Lakin | 310/89 |
| 6,229,903 B1 * | 5/2001 | Kobayashi | 381/410 |
| 6,777,895 B2 * | 8/2004 | Shimoda et al. | 318/114 |
| 7,224,090 B2 * | 5/2007 | Oh et al. | 310/14 |
| 2005/0184601 A1 * | 8/2005 | Kweon et al. | 310/36 |
| 2006/0022781 A1 * | 2/2006 | Kim | 335/296 |

\* cited by examiner

*Primary Examiner* — Tran Nguyen
(74) *Attorney, Agent, or Firm* — Blakely Sokoloff Taylor & Zafman LLP

(57) ABSTRACT

Disclosed herein is a linear vibrator. The linear vibrator includes a casing defining an internal space. A vibratory unit is accommodated in the casing to vibrate up and down. A spring is mounted at an upper circumferential end thereof to an upper surface of the casing and secured at a lower end thereof to an upper portion of the vibratory unit, thus elastically supporting the vibratory unit. An annular locking ring has a larger outer diameter than an outer diameter of the vibratory unit and an outer diameter of the spring so that the upper circumferential end of the spring is locked to the casing through press-fitting. A bracket supports the casing and the vibratory unit, with a circuit board being mounted on the bracket.

2 Claims, 3 Drawing Sheets

LINEAR VIBRATOR

CROSS REFERENCE TO RELATED APPLICATION(S)

This application claims the benefit of Korean Patent Application No. 10-2009-0068404, filed on Jul. 27, 2009, entitled "LINEAR VIBRATOR", which is hereby incorporated by reference in its entirety into this application.

BACKGROUND OF THE INVENTION

1. Technical Field

The present invention relates to a linear vibrator.

2. Description of the Related Art

The most important feature of an electronic device, such as a mobile phone, is the generation of vibration. A vibration motor is a means for generating vibration and is constructed so that its axis is eccentric or the center of gravity leans to one side and thereby the motor generates vibrations as it rotates. Such a vibration motor is problematic in that a brush passes through a gap between segments when the motor rotates, so that friction and sparks are generated, and thus the lifespan of the motor is reduced. In addition to these problems, the vibration motor has other problems as well.

In order to overcome the drawbacks of the vibration motor, a linear vibrator has been developed. In the linear vibrator, a vibratory unit mounted to a spring vibrates while performing rectilinear motion in a vertical or horizontal direction as a result of electromagnetic force between a magnet and a coil, so that friction and abrasion do not occur unlike in the vibration motor, and thus the lifespan of the linear vibrator is long. Further, the miniaturization of the linear vibrator is possible. Accordingly, a variety of types of linear vibrators are currently in development.

However, the conventional linear vibrator is problematic in that a welding method is used to lock the spring, so that the lifespan of the spring is reduced because of oxidation or deterioration.

Further, since a bracket and a casing are assembled with each other through welding, the cost of equipment investment is high, and productivity is reduced.

Therefore, research into a method of locking the spring without using the welding process which shortens the lifespan of the spring is urgent.

SUMMARY OF THE INVENTION

The present invention has been made in an effort to provide a linear vibrator, which is capable of preventing the abrasion of parts and the reduction in the lifespan of the parts, in addition to simplifying a manufacturing process.

In a linear vibrator according to an embodiment of the present invention, a casing defines an internal space. A vibratory unit is accommodated in the casing to vibrate up and down. A spring is mounted at an upper circumferential end thereof to an upper surface of the casing and secured at a lower end thereof to an upper portion of the vibratory unit, thus elastically supporting the vibratory unit. An annular locking ring has a larger outer diameter than an outer diameter of the vibratory unit and an outer diameter of the spring so that the upper circumferential end of the spring is locked to the casing through press-fitting. A bracket supports the casing and the vibratory unit, with a circuit board being mounted on the bracket.

A height of the locking ring may be lower than a height of the casing, and a lower end of the casing may be coupled to a side end of the bracket through caulking, so that the bracket supports the locking ring from beneath.

The spring may comprise a plate spring.

Further, in a linear vibrator according to another embodiment of the present invention, a casing encloses a vibratory unit and a stationary unit, with protrusions provided on facing surfaces in the upper portion of the casing. The upper circumferential end of a spring is locked by the protrusions, and the lower end of the spring is locked to the vibratory unit, so that the spring elastically supports the vibratory unit. The vibratory unit is connected to the lower end of the spring and placed in the casing to vibrate up and down. A bracket supports the vibratory unit and the stationary unit, with a circuit board mounted on the bracket.

A lower end of the casing may be coupled to a side end of the bracket through caulking.

The spring may comprise a plate spring.

DESCRIPTION OF THE PREFERRED EMBODIMENTS

Figure 1:
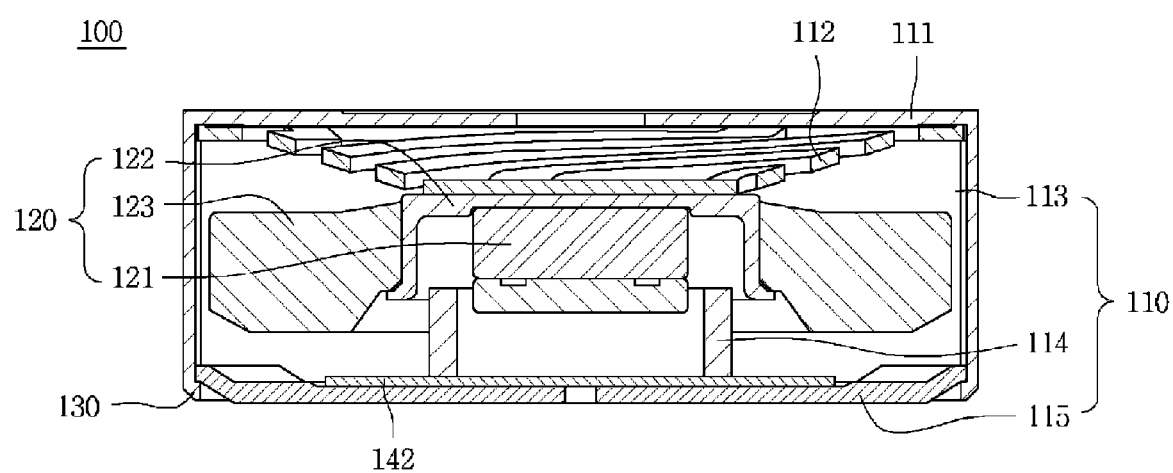
FIG. 1 is a sectional view illustrating a linear vibrator according to a first embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. Herein, the same reference numerals are used throughout the different drawings to designate the same components. Further, when it is determined that the detailed description of the known art related to the present invention may obscure the gist of the present invention, the detailed description will be omitted herein.

Hereinafter, linear vibrators according to the preferred embodiments of the present invention will be described in detail with reference to the accompanying drawings.

Figure 2:
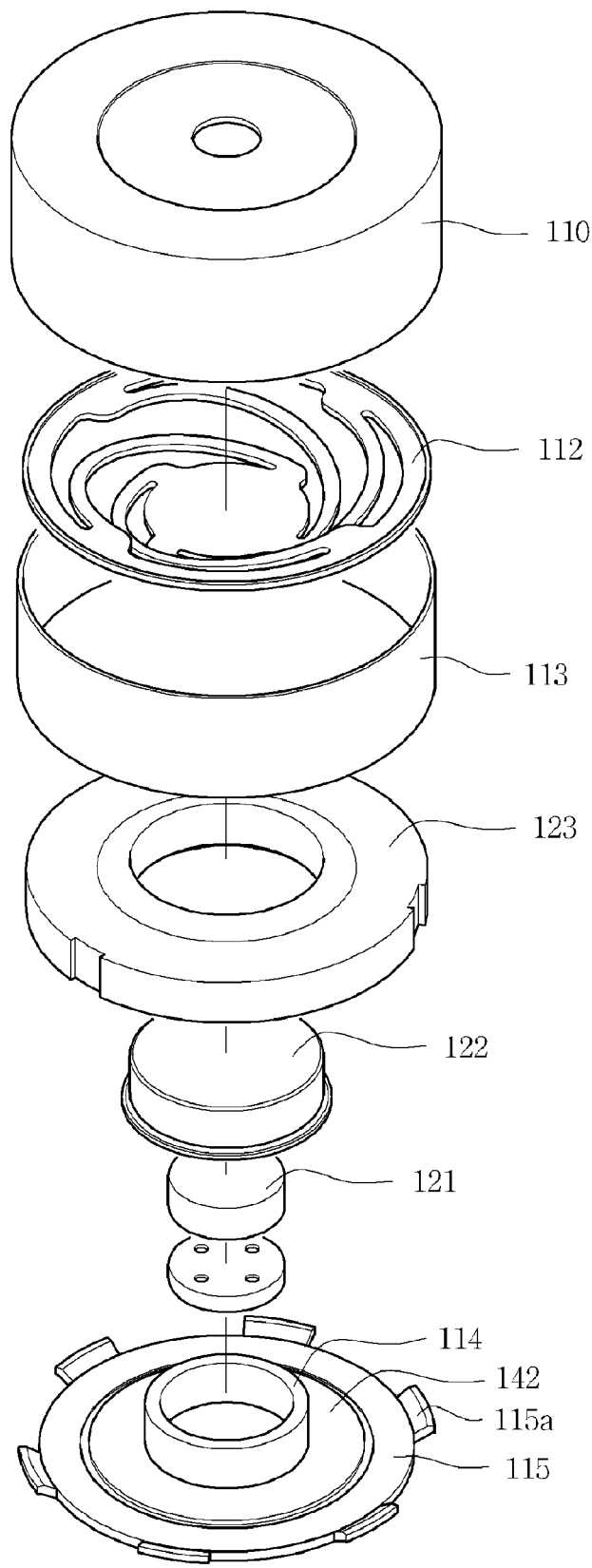
FIG. 2 is an exploded perspective view illustrating the linear vibrator according to the present invention.
Figure 3:
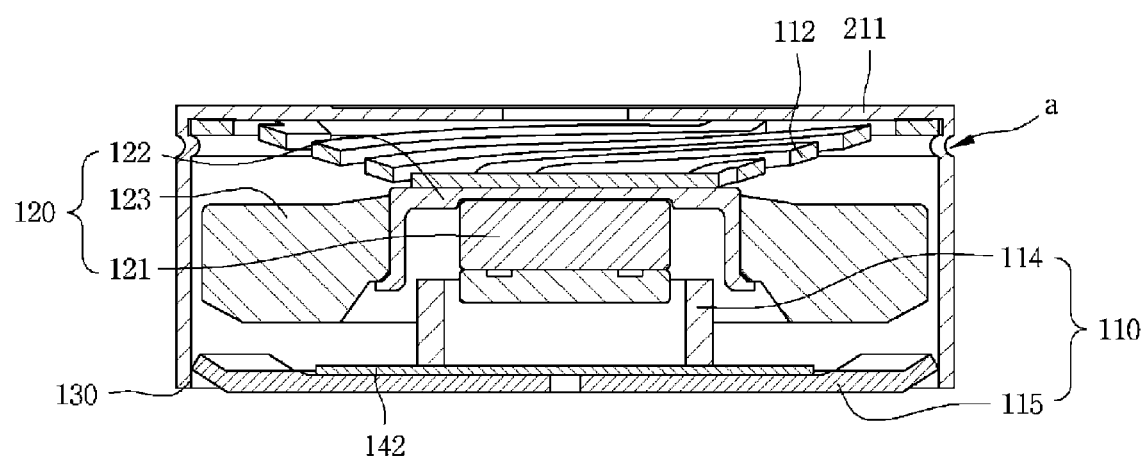
FIG. 3 is a sectional view illustrating a linear vibrator according to a second embodiment of the present invention.

As shown in FIGS. 1 to 3, a linear vibrator 100 according to the present invention includes a stationary unit 110, a vibratory unit 120, and a caulking part 130, and is operated such that the vibratory unit 120 is vibrated in a vertical direction by interaction between the magnetic force of a magnet 121 and the electromagnetic force of a frequency generated in a coil 114.

The stationary unit 110 includes a casing 111 which entirely encloses the linear vibrator 100 and defines an internal space. A spring 112 is provided on the upper surface of the casing 111 to elastically support the vibratory unit 120. A locking ring 113 press-fits the upper circumferential end of the spring 112 to the upper surface of the casing 111 so that the spring 112 is locked to the casing 111. The coil 114 is mounted under the vibratory unit 120. A bracket 115 functions to entirely support the linear vibrator 100.

The casing 111 is mounted to surround the top and widthwise sides of the linear vibrator 100, thus protecting the linear vibrator 100 from external impact.

The spring 112 is an elastic member which is connected to the vibratory unit 120 and generates maximum displacement at a resonance point when a frequency is applied, thus inducing vibration. The upper circumferential end of the spring 112 is secured to the interior portion of the upper surface of the casing 111, and the lower end of the spring 112 is secured to the upper portion of the vibratory unit 120, thus elastically supporting the vibratory unit 120.

Preferably, the spring 112 comprises a plate spring which is deformable to be changed from a state where opposite sides thereof are parallel to each other in such a way as to be spaced apart from each other by a predetermined interval, to a state where the opposite sides form the same plane, when the vibratory unit 120 moves up and down. The spring 112 is secured to the upper surface of the casing 111 through bonding or by the locking ring 113 which is fitted into the casing 111 in a direction from a lower position thereof to an upper position thereof.

The locking ring 113 has an outer diameter which is larger than an outer diameter of the vibratory unit 120 or an outer diameter of the spring 112. The upper surface of the locking ring 113 contacts a predetermined portion of the outer circumference of the spring 112, thus maintaining the coupling of the spring 112 with the casing 111 against drawing force. Therefore, the spring 112 can be firmly coupled to the casing 111, in addition to ensuring the long lifespan of the linear vibrator 100.

The locking ring 113 accommodates the vibratory unit 120 which vibrates up and down. The coil 114 is mounted to the lower portion of the vibratory unit 120 to interact with the magnet 121, thus generating electromagnetic force of a predetermined frequency.

The bracket 115 is provided under the coil 114 to support the lower portion of the linear vibrator 100.

The bracket 115 is made of a non-magnetic or weakly magnetic substance so as not to affect a drive unit, and a circuit board 142 connected to an input terminal is mounted on the bottom in the bracket 115.

The bracket 115 forms projecting part 115a in its circumferential end. And the annular locking ring 113 is supported by the projecting part.

The circuit board 142 includes a pattern which connects power, applied from the exterior, to the coil 114.

The vibratory unit 120 is accommodated in the central portion of the locking ring 113 to move up and down and includes the magnet 121, a yoke 122 which surrounds the magnet 121, and a mass body 123 which is attached to the outer circumference of the yoke 122 and has a predetermined mass.

The yoke 122 has a circular shape to surround the top and sides of the magnet 121, and a projecting part is integrally formed on a lower edge of the yoke 122 to allow the mass body 123 to be easily seated on the yoke 122. Further, a coupler (not shown) protrudes from the top of the yoke 122 so that the spring 112 is coupled to the coupler.

The yoke 122 forms a magnetic circuit together with the magnet 121 to optimize the magnetic flux of the magnet 121 which interlinks with the coil 114. Further, the mass body 123 is seated on the projecting part of the yoke 122, so that the mass body 123 is secured to the yoke 122.

The mass body 123 interacts with the magnet 121 in response to the power signal of the coil 114, thus generating vibrations in the vertical direction. The mass body 123 is seated on the projecting part of the yoke 122, so that the mass body 123 entirely encloses the yoke 122.

Preferably, the mass body 123 has a specific gravity which is heavier than iron (Fe). This increases the mass of the vibratory unit 120 in the same volume, thus adjusting resonance frequency related to the mass of the vibration unit, and maximizing vibrational strength.

Preferably, the mass body 123 is stepped such that it does not correspond to the coil 114, and is enlarged laterally to correspond to the spring 112, thus having a larger mass. Such a construction also increases mass in a given volume, thus maximizing vibrational strength.

Generally, in the linear vibrator using resonance frequency F, as shown in the following [Equation 1], the resonance frequency F is determined by the mass of the mass body 123 and the elastic modulus k of the spring 112. When power having the resonance frequency F is applied to the coil 114 and current flows in the coil 114, the vertical displacement and vibration of the mass body 123 assume maximum values.

$$F = \frac{1}{2\pi}\sqrt{\frac{k}{m}}$$ [Equation 1]

In order to correct the inherent frequency of the linear vibrator 100, the vibratory unit 120 is provided with at least one hole (not shown) to add to or subtract from the mass of the vibratory unit 120.

The height of the locking ring 113 accommodating the vibratory unit 120 therein is slightly shorter than the height of the casing 111. The caulking part 130 is formed by securing the lower end of the casing 111 to the side end of the bracket 115 through caulking, and allows the locking ring 113 to be supported by the bracket 115.

The locking ring 113 is provided under the spring 112 to press-fit the upper circumferential end of the spring 112, thus locking the spring 112 to the casing 111.

The locking ring 113 locks the spring 112 to the casing 111 through press-fitting. Such a construction obviates a welding process for the coupling of the spring 112 with the casing 111, unlike a conventional linear vibrator, thus preventing the abrasion or deformation of the spring 112 caused by the welding process.

The casing 111 is formed such that its side is thin so as to enable easy caulking. Thereby, an empty space is formed between the locking ring 113 and the casing 111.

The lower end of the casing 111 and the side end of the bracket 115 are secured to each other through caulking, so that the conventional welding process is not required and thus deformation and abrasion caused by the welding process are prevented.

FIG. 3 is a sectional view illustrating a linear vibrator according to a second embodiment of the present invention. Since this embodiment is identical with the first embodiment except that the second embodiment has no locking ring 113, so that a protrusion 'a' which protrudes into a casing 111 locks the upper circumferential end of a spring 112, a duplicate description thereof will be omitted herein. Herein, the same reference numerals are used throughout the different drawings to designate the same components.

In the linear vibrator according to the second embodiment of the present invention, the protrusion 'a' of the casing 111 secures the spring 112 to the casing 111, so that a welding process for locking the spring 112 to the casing 111 is unnecessary. Thus, it is possible to lock the spring without the abrasion or deformation of the spring 112 caused by the welding process.

As such, in the linear vibrator 100 according to the present invention, the spring 112 is locked to the upper surface of the casing 111 through press-fitting using the locking ring 113, and the lower end of the casing 111 is joined to the side end of the bracket 115 through caulking, so that a locking step using the welding process can be omitted.

Therefore, the abrasion or deformation of parts resulting from the welding process is prevented, and the separation of the spring 112 from the casing 111 and the deterioration of quality resulting from variations in the weld resulting from different welding conditions and the abrasion of an electrode which may occur during the welding process are prevented. The linear vibrator of this invention solves the above problems, prolongs the lifespan of the spring 112, and obviates the process of welding the casing 111 to the bracket 115, thus reducing the cost of equipment investment and improving productivity.

As described above, the present invention provides a linear vibrator, in which a spring is fitted and locked to an upper surface of a casing using a locking ring, and the lower end of the casing is locked to the side end of a bracket through caulking, so that a welding process is not required.

Therefore, the abrasion or deformation of parts caused by the welding process is prevented, and the separation of the spring from the casing and the deterioration of quality resulting from variations in the weld resulting from different welding conditions and the abrasion of an electrode which may occur during the welding process are prevented. In addition to solving the above problems, the linear vibrator of this invention prolongs the lifespan of the spring, and does not require the welding of the casing and the bracket to each other, thus simplifying a manufacturing process and improving productivity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. A linear vibrator, comprising:
   a casing defining an internal space;
   a vibratory unit accommodated in the casing to vibrate up and down;
   a spring mounted at an upper circumferential end thereof to an upper surface of the casing, and secured at a lower end thereof to an upper portion of the vibratory unit, thus elastically supporting the vibratory unit;
   an annular locking ring having a larger outer diameter than an outer diameter of the vibratory unit and an outer diameter of the spring so that the upper circumferential end of the spring is locked to the casing through press-fitting; and
   a bracket supporting the casing and the vibratory unit,
   wherein a height of the locking ring is lower than a height of the casing, the bracket forms a projecting part in its circumferential end, a lower end of the casing is coupled to the projecting part of the bracket through caulking, and the annular locking ring is supported by the projecting part.

2. The linear vibrator as set forth in claim 1, wherein the spring comprises a plate spring.

\* \* \* \* \*